United States Patent
Jones et al.

(10) Patent No.: US 8,577,126 B2
(45) Date of Patent: *Nov. 5, 2013

(54) SYSTEM AND METHOD FOR COOPERATIVE REMOTE VEHICLE BEHAVIOR

(75) Inventors: Christopher Vernon Jones, Woburn, MA (US); Odest Chadwicke Jenkins, Pawtucket, RI (US); Matthew M. Loper, Providence, RI (US)

(73) Assignee: iRobot Corporation, Bedford, MA (US)

( * ) Notice: Subject to any disclaimer, the term of this patent is extended or adjusted under 35 U.S.C. 154(b) by 931 days.

This patent is subject to a terminal disclaimer.

(21) Appl. No.: 12/101,949

(22) Filed: Apr. 11, 2008

(65) Prior Publication Data

US 2008/0253613 A1 Oct. 16, 2008

Related U.S. Application Data (60) Provisional application No. 60/911,211, filed on Apr. 11, 2007.

(51) Int. Cl.
*G06K 9/00* (2006.01)

(52) U.S. Cl.
USPC ........... 382/154; 382/103; 382/106; 700/259; 715/863; 348/77; 348/114

(58) Field of Classification Search
USPC .................. 382/154, 103, 106; 700/245, 259; 704/E13.001, E15.001, E21.019, 275; 715/863; 348/77, 114
See application file for complete search history.

(56) References Cited

U.S. PATENT DOCUMENTS

| | | | |
|---|---|---|---|
| 5,880,788 A | 3/1999 | Bregler | |
| 6,111,983 A | 8/2000 | Fenster et al. | |
| 6,339,706 B1 | 1/2002 | Tillgren et al. | |
| 6,879,384 B2 | 4/2005 | Riegl et al. | |
| 7,003,136 B1 * | 2/2006 | Harville | 382/103 |
| 7,203,356 B2 | 4/2007 | Gokturk et al. | |
| 7,274,800 B2 * | 9/2007 | Nefian et al. | 382/103 |
| 7,551,980 B2 | 6/2009 | Sakagami et al. | |
| 7,668,338 B2 * | 2/2010 | Yoon et al. | 382/103 |
| 7,706,571 B2 | 4/2010 | Das et al. | |
| 8,106,616 B1 * | 1/2012 | Theobald | 318/568.2 |
| 8,346,391 B1 * | 1/2013 | Anhalt et al. | 700/248 |
| 2003/0007649 A1 * | 1/2003 | Riggs | 381/86 |
| 2004/0199292 A1 * | 10/2004 | Sakagami et al. | 700/259 |

(Continued)

FOREIGN PATENT DOCUMENTS

WO    WO 2006092251    9/2006

OTHER PUBLICATIONS

Urban et al., "Fusion of voice, gesture, and human-computer interface controls for remotely operated robot" 8th International Conference on Information Fusion, pp. 1644-1651, Jul. 2005.*

(Continued)

*Primary Examiner* — Aaron W Carter
(74) *Attorney, Agent, or Firm* — Myers Bigel Sibley & Sajovec (57) ABSTRACT

A method for facilitating cooperation between humans and remote vehicles comprises creating image data, detecting humans within the image data, extracting gesture information from the image data, mapping the gesture information to a remote vehicle behavior, and activating the remote vehicle behavior. Alternatively, voice commands can by used to activate the remote vehicle behavior.

14 Claims, 8 Drawing Sheets

(56) References Cited

U.S. PATENT DOCUMENTS

| | | | |
|---|---|---|---|
| 2005/0166413 A1* | 8/2005 | Crampton | 33/503 |
| 2005/0271279 A1* | 12/2005 | Fujimura et al. | 382/203 |
| 2006/0039587 A1* | 2/2006 | Yoon et al. | 382/115 |
| 2006/0200364 A1* | 9/2006 | Riggs | 705/1 |
| 2006/0223637 A1* | 10/2006 | Rosenberg | 463/47 |
| 2006/0271246 A1* | 11/2006 | Bell et al. | 701/1 |
| 2007/0049363 A1* | 3/2007 | Green et al. | 455/575.2 |
| 2007/0263907 A1* | 11/2007 | McMakin et al. | 382/115 |
| 2008/0086241 A1* | 4/2008 | Phillips et al. | 701/2 |
| 2008/0150965 A1 | 6/2008 | Bischoff et al. | |
| 2008/0219502 A1* | 9/2008 | Shamaie | 382/103 |
| 2009/0180668 A1* | 7/2009 | Jones et al. | 382/103 |
| 2011/0295469 A1 | 12/2011 | Rafii et al. | |
| 2012/0176344 A1* | 7/2012 | Shamaie | 345/175 |
| 2012/0293408 A1* | 11/2012 | Shamaie | 345/156 |

OTHER PUBLICATIONS

Holte et al., "Gesture Recognition using a Range Camera", Technical Report CVMT-07-01 ISSN 1601-3646, Feb. 2007.*
Yamauchi, Brian. "All-Weather Perception for Small Autonomous UGVs". In Proceedings of SPIE Defense and Security Conference, Orlando, FL, Mar. 2008.
Lenser, Scott et al., "Practical problems in sliding scale autonomy: A case study". In Proceedings of SPIE Defense and Security Conference, Orlando, FL, Mar. 2008.
Cheung, Carol et al., "UAV-UGV Collaboration with a PackBot UGV and Raven SUAV for Pursuit and Tracking of a Dynamic Target". In Proceedings of SPIE Defense and Security Conference, Orlando, FL, Mar. 2008.
Schoenfeld, Erik et al., "Door Breaching Robotic Manipulator". In Proceedings of SPIE Defense and Security Conference, Orlando, FL, Mar. 2008.
Yamauchi, Brian. "Daredevil: Ultra Wideband Radar Sensing for Small UGVs", In Proceedings of SPIE: Unmanned Systems Technology IX, Orlando, FL, Apr. 2007.
Yamauchi, Brian. "Autonomous Urban Reconnaissance Using Man-Portable UGVs", In Proceedings of SPIE: Unmanned Ground Vehicle Technology VIII, Orlando, FL, Apr. 2006.
Yamauchi, Brian. "Wayfarer: An Autonomous Navigation Payload for the PackBot", In Proceedings of AUVSI Unmanned Vehicles North America 2005, Baltimore, MD, Jun. 2005.
Barnes, Mitch et al., "ThrowBot: Design Considerations for a Man-Portable Throwable Robot", In Proceedings of SPIE vol. 5804, Mar. 2005.
Rudakevych, Pavlo et al., "PackBot EOD Firing System", In Proceedings of SPIE vol. 5804, Mar. 2005.
Yamauchi, Brian et al., "Griffon: a man-portable hybrid UGV/UAV", In Industrial Robot: An International Journal, vol. 31 No. 5, 2004.
Yamauchi, Brian. "PackBot: A Versatile Platform for Military Robotics", In Proceedings of SPIE vol. 5422: Unmanned Ground Vehicle Technology VI, Orlando, FL, Apr. 2004.
Sword, Lee et al., "Mobility Enhancements for Ballistically Deployed Sensors", In Proceedings of SPIE vol. 4393, Apr. 2001.
Rudakevych, Pavlo. "Wave Control: A Method of Distributed Control for Repeated Unit Tentacles", In Proceedings of SPIE vol. 3839, Aug. 1999.
Arker, L.E., "ALLIANCE: An Architecture for Fault Tolerant Multi-Robot Cooperation," IEEE Transactions on Robotics and Automation, 14 (2), 1998.
Balch, T.R. and Arkin, R.C., "Behavior-based formation control for multiagent robot teams," IEEE Transactions on Robotics and Automation, 14(6): 926-939, Dec. 1998.
Dias, M.B. and Stentz. A., "A Comparative Study Between Centralized, Market-Based, and Behavioral Multirobot Coordination Approaches," Proceedings of the 2003 IEEE/RSJ International Conference on Intelligent Robotics and Systems (IROS), Oct. 2003.
Gerkey, B. and Mataric, M., "A formal analysis and taxonomy of task allocation in multi-robot systems," International Journal of Robotics Research, 23(9):939-954, Sep. 2004.

Hougen, D.F., et al., "Reconfigureable Robots for Distributed Robotics," Government Microcircuit Applications Conference, pp. 72-75, Mar. 2000.
Jones, Chris, "A Principled Design Methodology for Minimalist Multi-Robot System Controllers" Ph.D. Dissertation, Department of Computer Science, University of Southern California, May 2005.
Koenig, N., Chernova, S., Jones, C, Loper, M, and Jenkins, C., "Natural Interaction for Human-Robot Teams," Submitted to the International Conference on Robotics and Automation (ICRA), San Diego, CA, May 2008.
Koenig, Nathan, "Toward Real-time Human Detection and Tracking in Diverse Environments," IEEE International Conference on Development and Learning (ICDL), Jul. 11-13, 2007, London, UK.
Nair, R., and Tambe, M., "Hybrid BDI-POMDP Framework for Multiagent Teaming," Journal of AI Research (JAIR), 23:367-420, 2005.
Praveen Paruchuri, P, Tambe, M, Ordonez, F. and Kraus, S., "Towards a formalization of teamwork with resource constraints," International Joint Conference on Autonomous Agents and Multiagent Systems (AAMAS-04), 2004.
Stentz, A., "Constrained Dynamic Route Planning for Unmanned Ground Vehicles," Proceedings of the ARL Collaborative Technologies Alliance Symposium, Apr. 2003.
Urban, M. and Bajcsy P., "Fusion of Voice, Gesture, Human-Computer Interface Controls for Remotely Operated Robot", National Center for Supercomputing Applications (NCSA), University ofIllinois at Urbana-Champaign, Champaign, IL, USA, Jul. 2005.
Murray, Sean et al, "Continued Research in EVA, Navigation, Networking and Communications Systems", SAE Proceedings, International Conference on Environmental Systems, Jun. 2008.
Yamauchi, Brian. "All-Weather Perception for Small Autonomous UGVs", In Proceedings of SPIE Defense and Security Conference, Orlando, FL, Mar. 2008.
Lenser, Scott et al., Practical problems in sliding scale autonomy: A case study, In Proceedings of SPIE Defense and Security Conference, Orlando, FL, Mar. 2008.
Cheung, Carol et al., "UAV-UGV Collaboration with a PackBot UGV and Raven SUAV for Pursuit and Tracking of a Dynamic Target", In Proceedings of SPIE Defense and Security Conference, Orlando, FL, Mar. 2008.
Schoenfeld, Erik et al., "Door Breaching Robotic Manipulator", In Proceedings of SPIE Defense and Security Conference, Orlando, FL, Mar. 2008.
Yamauchi, Brian, "Daredevil: Ultra Wideband Radar Sensing for Small UGVs", In Proceedings of SPIE: Unmanned Systems Technology IX, Orlando, FL, Apr. 2007.
Rudakevych, Pavlo et al., "Integration of the Fido Explosives Detector onto the PackBot EOD UGV", In Proceedings of SPIE vol. 6561, Mar. 2007.
Rudakevych, Pavlo et al., "A man portable hybrid UAV/UGV system", In Proceedings of SPIE vol. 6561, Mar. 2007.
Jones, Chris et al., "Sentinel: An Operator Interface for the Control of Multiple Semi-Autonomous UGVs", In Proceedings of the Association for Unmanned Vehicles Systems International. Orlando, FL, Aug. 2006.
Yamauchi, Brian. "Autonomous Urban Reconnaissance Using Man-Portable UGV5", In Proceedings of SPIE: Unmanned Ground Vehicle Technology VIII, Orlando, FL, Apr. 2006.
Yamauchi, Brian, "Wayfarer an Autonomous Navigation Payload for the PackBot", In Proceedings of AUVSI Unmanned Vehicles North America 2005, Baltimore, MD, Jun. 2005.
Barnes, Mitch et al., ThrowBot: Design Considerations for a Man-Portable Throwable Robot, In Proceedings of SPIE vol. 5804, Mar. 2005.
Rudakevych, Pavlo et al .,PackBot EOD Firing System, In Proceedings of SPIE vol. 5804, Mar. 2005.
Yamauchi, Brian. "The Wayfarer Modular Navigation Payload for Intelligent Robot Infrastructure", In Proceedings of SPIE vol. 5804: Unmanned Ground Technology VII, Orlando, FL, Mar. 2005.
Yamauchi, Brian et al., Griffon: a man-portable hybrid UGV/UAV, In Industrial Robot: An International Journal, vol. 31 No. 5, 2004.

(56) References Cited

OTHER PUBLICATIONS

Yamauchi, Brian, "PackBot: A Versatile Platform for Military Robotics", In Proceedings of SPIE vol. 5422: Unmanned Ground Vehicle Technology VI, Orlando, FL, Apr. 2004.
Sword, Lee et al., Mobility Enhancements for Ballistically Deployed Sensors, In Proceedings of SPIE vol. 4393, Apr. 2001.
Rudakevych, Pavlo,, "Wave Control: A Method of Distributed Control for Repeated Unit Tentacles", In Proceedings of SPIE vol. 3839, Aug. 1999.
Rudakevych, Pavlo et al., "Micro Unattended Mobility System (MUMS)", In Proceedings of SPIE vol. 3713, Jul. 1998.
Parker, L.E.,"ALLIANCE: An Architecture for Fault Tolerant Multi-Robot Cooperation," IEEE Transactions on Robotics and Automation, 14(2), 1998.
Balch, T,R, and Arkin. R.C.,"Behavior-based formation control for multiagent robot teams," IEEE Transactions on Robotics and Automation, 14(6): 926-939, Dec. 1998.
Dias, M,B, and Stentz, A,,"A Comparative Study Between Centralized, Market-Based, and Behavioral Multirobot Coordination Approaches," Proceedings of the 2003 IEEE/RSJ International Conference on Intelligent Robotics and Systems (IROS), Oct. 2003.
Gerkey, B, and Mataric, M "A formal analysis and taxonomy of task allocation in multi-robot systems," International Journal of Robotics Research. 23(9):939-954, Sep. 2004.
Gerkey, Brian P. and Maja J. Mataric, "Sold!: Auction Methods for Multi-Robot Coordination," IEEE Transactions on Robotics and Automation, Special Issue on Multi-Robot Systems, 18(5):758-768, Oct. 2002.
Hougen, D.F., et al. "Reconfigureable Robots for Distributed Robotics," Government Microcircuit Applications Conference, pp. 72-75, Mar. 2000.
Jones, Chris, Shell, D., Mataric, M., Gerkey, B., "Principled Approaches to the Design of Multi-Robot Systems," Invited contribution to Workshop on Networked Robotics, International Conference on Intelligent Robots and Systems, pp. 71-80, Sendai, Japan, Sep. 2004.
Jones, Chris, "A Principled Design Methodology for Minimalist Multi-Robot System Controllers," Ph.D. Dissertation, Department of Computer Science, University of Southern California, May 2005.
Koenig, Nathan, "Toward Real-time Human Detection and Tracking in Diverse Environments," In the IEEE International Conference on Development and Learning (ICDL), Jul. 11-13, 2007, London, UK.
Mackenzie, D.C., Arkin, R.C., and Cameron, J.M, "Multiagent Mission Specification and Execution," Proc. SPIE vol. 3838, Mobile Robots XIV. Douglas W. Gage and Howie M. Choset, eds., Aug. 1999.
Nair, R., and Tambe, M. Hybrid BDI-POMDP Framework for Multiagent Teaming, Journal of AI Research (JAIR), 23:367-420, 2005.
Praveen Paruchuri, P. Tambe, M, Ordonez, F. and Kraus, S., "Towards a formalization of teamwork with resource constraints," International Joint Conference on Autonomous Agents and Multiagent Systems (AMAS-04), 2004.
Stentz, A.. "Constrained Dynamic Route Planning for Unmanned Ground Vehicles," Proceedings of the ARL Collaborative Technologies Alliance Symposium. Apr. 2003.
Urban, M. and Bajcsy P., "Fusion of Voice, Gesture, Human-Computer Interface Controls for Remotely Operated Robot," National Center for Supercomputing Applications (NCSA), University of Illinois at Urbana-Champaign, Champaign, IL, USA, 2005.
Office Action, dated Oct. 19, 2011, from U.S. Appl. No. 12/101,949.
Koenig, N., Chemova, S.,Jones, C, Loper, M. and Jenkins, C—"Natural Interaction for Human-Robot Teams," Submitted to the International Conference on Robotics and Automation (ICRA), San Diego, CA, May 2008.
Oggier et al., An-all-solid-state optical range camera for 3D real-time imaging with sub-centimeter depth resolution (SwissRanger), Proc. SPIE [on-line], 2004 [retrieved on Mar. 9, 2012], vol. 5249, pp. 534-545. Retrieved from the Internet: <URL: http://spiedigitallibrary.org/proceedings/resource/2/psisdg/5249/1 /534_ i>.
Jones, Chris. "A Principled Design Methodology for Minimalist Multi-Robot System I Controllers". Ph.D. Dissertation, Department of Computer Science, University of Southern I California, May 2005. I.

* cited by examiner

FIG. 14

SYSTEM AND METHOD FOR COOPERATIVE REMOTE VEHICLE BEHAVIOR

This application claims priority to U.S. Provisional Patent Application Ser. No. 60/911,221, filed Apr. 11, 2007, the entire content of which is incorporated herein by reference in its entirety.

This invention was made with Government support under contract no. W31P4Q-07-C-0096, awarded by the U.S. Army Aviation and Missile Command, and under contract no. ONR N-00014-07-M-0123, awarded by the Office of Naval Research. The Government has certain rights in the invention.

FIELD

The present teachings relate to systems and methods for facilitating collaborative performance of humans and remote vehicles such as robots.

BACKGROUND

Remote vehicles such as robots can be used in a variety of applications that would benefit from the ability to effectively collaborate with humans, including search-oriented applications (e.g., de-mining, cave exploration, foraging), rendering improvised explosive devices (IEDs) safe, and various other intelligence, surveillance and reconnaissance (ISR) missions. In addition, given then ability to effectively collaborate with humans, remote vehicles could be used in applications that require collaboration-oriented taskings in which is utilized member of a human/robot team, such as, for example, building clearing. Utilizing remote vehicles in building clearance and other similar tactical missions would help keep humans out of harm's way.

Remote vehicle and human teams performing tightly coordinated tactical maneuvers can achieve high efficiency by using the strengths of each member. Remote vehicle strengths include expendability, multi-modal sensing, and never tiring; while humans have better perception and reasoning capabilities. Taking advantage of these strength sets requires tight coordination between the humans and remote vehicles, with the remote vehicles reacting in real-time or near real-time to dynamically changing events as they unfold. The remote vehicle should also understand the goal and intentions of human team members' actions so that they can respond appropriately.

Having a human team member controlling the remote vehicles with a joystick during dynamic tactical maneuvers is less than ideal because it requires a great deal of the controlling human's attention. To enable a human operator to perform tactical maneuvers in conjunction with remote vehicles, the operator should be unencumbered and untethered and able to interact—to the greatest extent possible—with the remote vehicle as he/she would with another human teammate. This means the operator should have both hands free (e.g., no hand-held controllers) and be able to employ natural communication modalities such as gesture and speech to control the remote vehicle. Thus, it is desirable for remote vehicles to interact with their human counterparts using natural communication modalities, including speech and speech recognition, locating and identifying team members, and understand body language and gestures of human team members.

SUMMARY OF THE INVENTION

Certain embodiments of the present teachings provide a system for facilitating cooperation between humans and remote vehicles. The system comprises a camera on the remote vehicle that creates an image, an algorithm for detecting humans within the image, and a trained statistical model for extracting gesture information from the image. The gesture information is mapped to a remote vehicle behavior, which is then activated.

Certain embodiments of the present teachings also or alternatively provide a method for facilitating cooperation between humans and remote vehicles. The method comprises creating image data, detecting humans within the image data, extracting gesture information from the image data, mapping the gesture information to a remote vehicle behavior, and activating the remote vehicle behavior.

Certain embodiments of the present teachings also or alternatively provide a method for facilitating cooperation between humans and remote vehicles. The method comprises issuing a voice command, analyzing a voice command, translating the voice command into a discrete control command, mapping the discrete control command to a remote vehicle behavior, and activating the remote vehicle behavior.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

DESCRIPTION OF EXEMPLARY EMBODIMENTS

Reference will now be made in detail to exemplary embodiments of the invention, examples of which are illustrated in the accompanying drawings.

Figure 1:
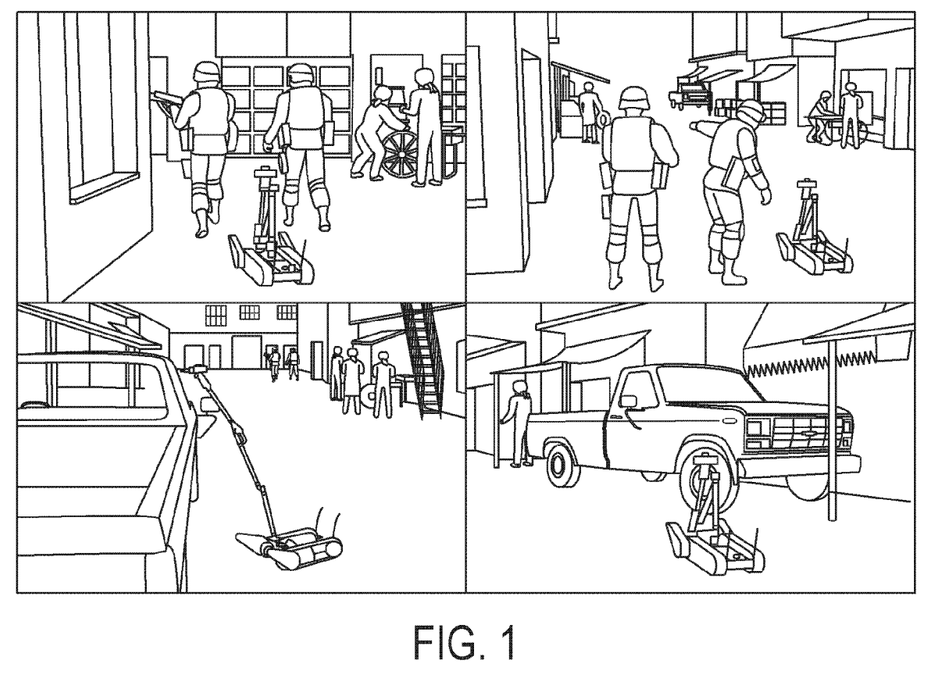
FIG. 1 illustrates an example of collaborative performance of humans and a remote vehicle.

The present teachings contemplate systems and methods for facilitating collaborative performance of humans and remote vehicle. FIG. 1 illustrates an example of collaborative performance of humans and a remote vehicle. Clockwise from top left: Soldiers patrol with a remote vehicle in follower mode; soldiers task the remote vehicle to investigate vehicle; the remote vehicle approaches vehicle and transmits video and sensor data to the soldiers; soldiers use a combination of voice commands, gesture recognition, and motion sensing controls to perform vehicle inspection.

Figure 2:
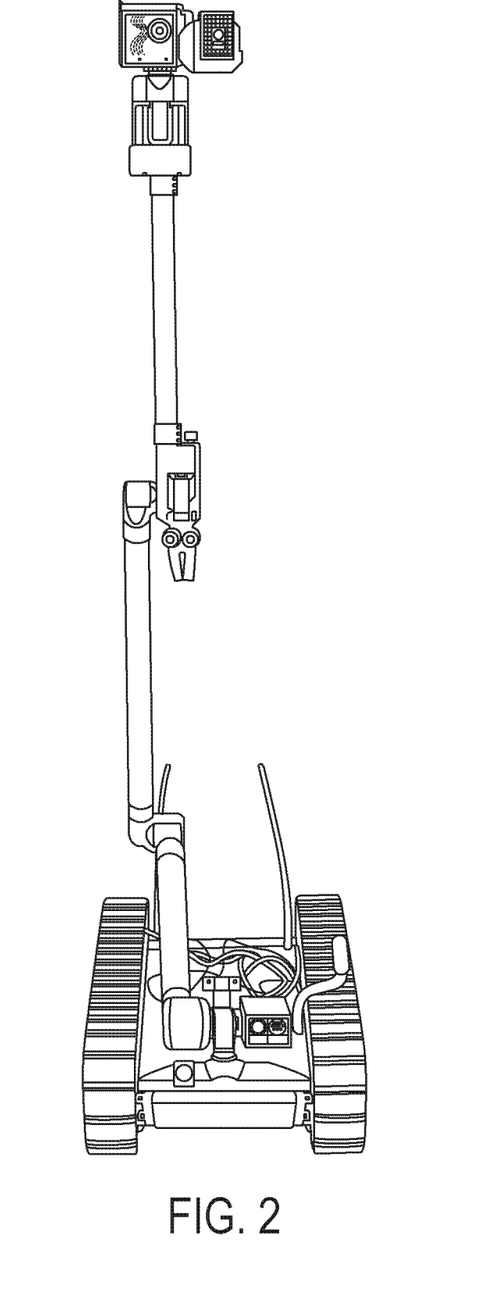
FIG. 2 illustrates an exemplary implementation of the present teachings, including an iRobot PackBot EOD equipped with a CSEM SwissRanger SR-3000 3D time-of-flight camera.
Figure 3:
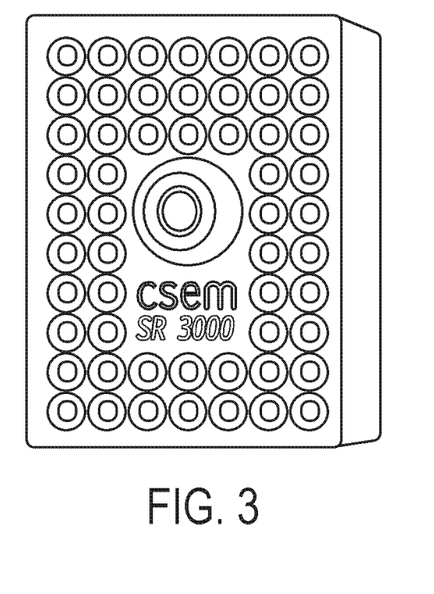
FIG. 3 shows a CSEM SwissRanger SR-3000 3D time-of-flight camera.
Figure 4:
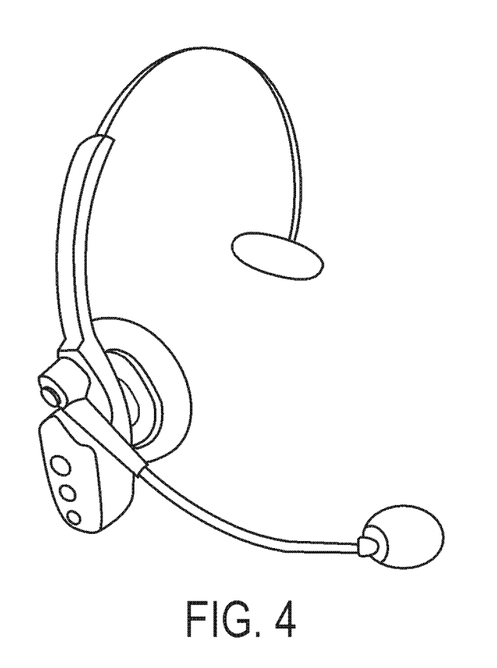
FIG. 4 is a wireless headset.

In certain exemplary implementations of the present teachings, the remote vehicle includes an iRobot PackBot EOD equipped with a CSEM SwissRanger SR-3000 3D time-of-flight camera. This implementation is illustrated in FIG. 2. The SwissRanger camera is illustrated in FIG. 3. The SR-3000 camera is used to detect people and subsequently to track and follow them. The detected people are also analyzed to extract gesture information through the use of a trained Hidden Markov Model. A wireless headset, as illustrated in FIG. 4, can be used to issue voice commands, which are analyzed through the use of speech recognition software running onboard the remote vehicle and translated into discrete control commands. In an exemplary implementation a Bluetooth headset is used.

Figure 5:
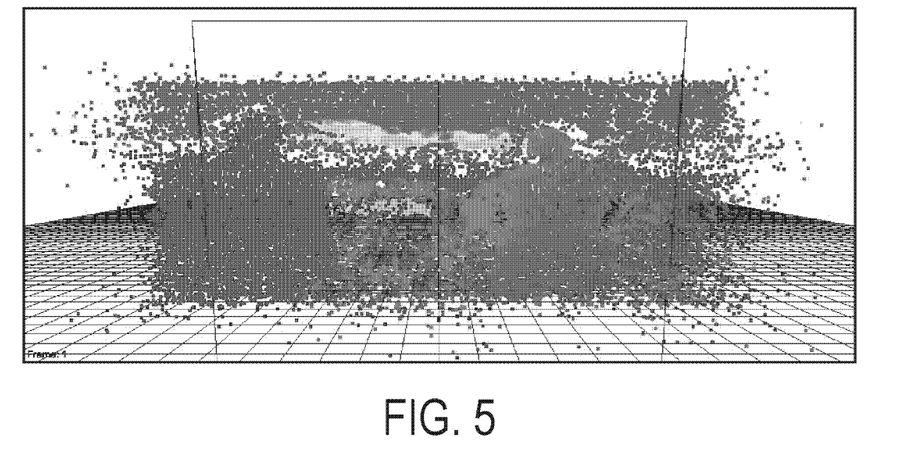
FIG. 5 is an intensity image in conjunction with a 3D point cloud, as provided by a SwissRanger camera.
Figure 6:
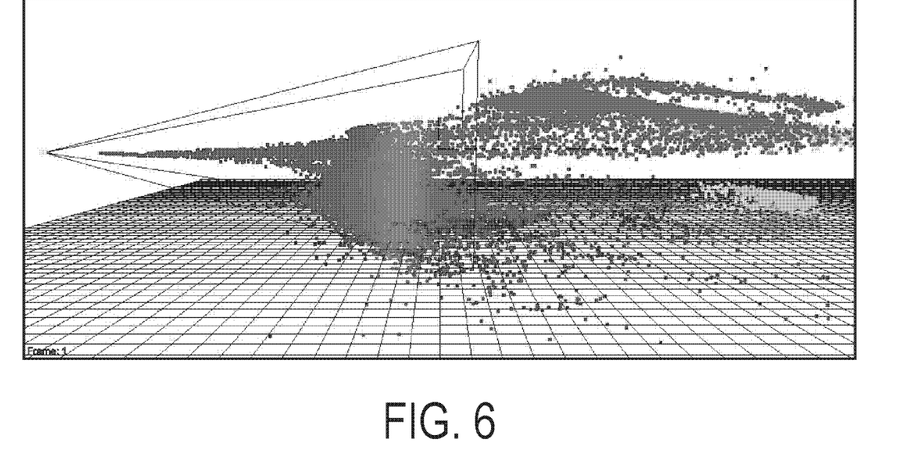
FIG. 6 is an intensity image in conjunction with a 3D point cloud, as provided by a SwissRanger camera.

The SwissRanger camera, which has a relatively small field of view at 47.5×39.6 degrees, can be used as the system's primary sensing device. In order to achieve the best viewing angle, the camera is mounted to the PackBot's extended arm, thereby placing the camera at a height of roughly five feet. This elevation allows the camera to clearly see a person's upper body and their gestures while minimizing skew and obstruction. The elevated camera gives the human team members a clear point of communication with the remote vehicle. The SwissRanger camera provides an intensity image in conjunction with a 3D point cloud, as shown in FIGS. 5 and 6.

One of the primary software routines involves detection and tracking of a human. Detection of moving people within a scene composed of depth data is a complex problem due to a wide range of possible viewing angles, clothes, lighting conditions, and background clutter. This challenge is addressed using image processing techniques that extract solid objects from the 3D data and identify and track people based on distinctive features found in all humans. A connected components image analysis algorithm extracts all large solid objects from the scene. Humans are then identified from this group of objects using a support vector machine (SVM) trained on the shape of a human. Using this approach, person size, shape, color, and clothing become irrelevant as the primary features are a person's head, shoulders, and arm location. The position of the detected human relative to the remote vehicle is tracked using a Kalman filter, which also provides a robust measurement of the person's pose.

Once a person is successfully detected in a scene, the remote vehicle must detect the person's gestures and respond accordingly. At each time step the gesture recognition algorithm scores the observed pose of the human's arms relative to a set of known gestures. When a sequence of observed arm poses match a complete sequence associated with a known gesture, the gesture is mapped to a behavior, which is then activated.

Speech, another natural form of communication, is used in conjunction with gestures. Voice commands map to behaviors that can be separate from those associated with gestures. This strategy decreases the chance of confusion and increases the range of behaviors the remote vehicle can execute. The remote vehicle processes voice input in real-time using the CMU Sphinx3 speech recognition system, which converts human speech to text. The trained recognition library works with a wide range of people and is primarily limited by strong speech accents. Raw data is gathered using a high-quality wireless headset worn by the human operator. By placing the microphone on the human, the operator has greater freedom of control and can operate the remote vehicle while out of direct line of sight.

Remote vehicle actions are managed using a suite of behaviors, such as person-following and obstacle-avoidance. Each behavior gathers data from the remote vehicle's sensors and outputs one or more motion commands. Conflicts between behaviors are resolved by assigning unique priorities to each behavior; commands from a low priority behavior are overridden by those from a high priority behavior.

Some exemplary behaviors that can be integrated with the remote vehicle include door-breaching, u-turn, start/stop following, and manual forward drive.

Human Detection and Tracking

Figure 7:
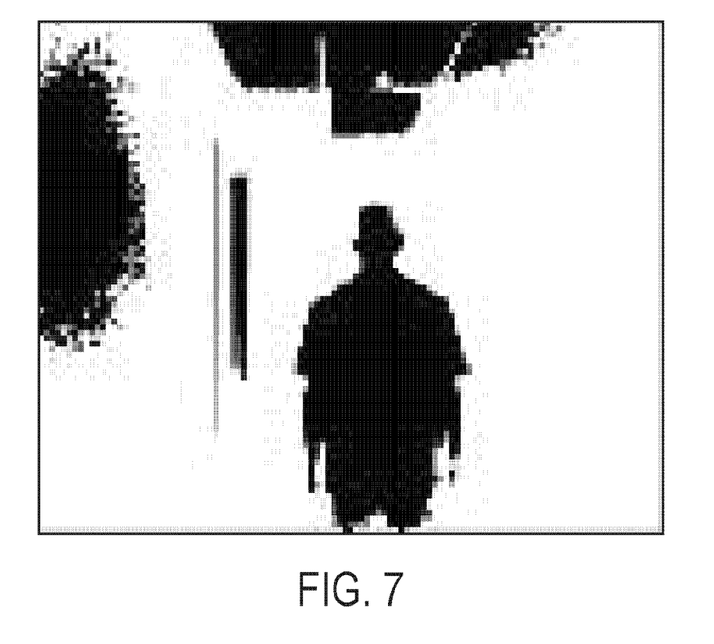
FIG. 7 is an intensity readings from a SwissRander camera.

In accordance with certain embodiments of the present invention, the primary sensing device for detection and tracking is a SwissRanger camera. A SwissRanger uses a two-dimensional array of high-powered LEDs and a custom CCD to measure the time-of-flight of the light emitted from the LEDs. A three-dimensional point cloud, as shown in FIGS. 5 and 6, results, and intensity readings as shown in FIG. 7 are returned at 12-29 Hz depending on the camera's initial configuration.

Human detection relies on the observation that contiguous objects generally have slowly varying depth. In other words, a solid object has roughly the same depth, or Z-value, over its visible surface. An algorithm capable of detecting these solid surfaces is ideally suited for human detection. Certain embodiments of the present teachings contemplate using a Connected Components algorithm, which groups together all pixels in an image based on a distance metric. Each pixel is a point in 3D space, and the distance metric is the Euclidean distance along the Z-axis between two points. If the distance is less than a threshold value the two points are considered to be part of the same object. The output of the algorithm is a set of groups, where each group is a disjoint collection of all the points in the image.

Figure 8:
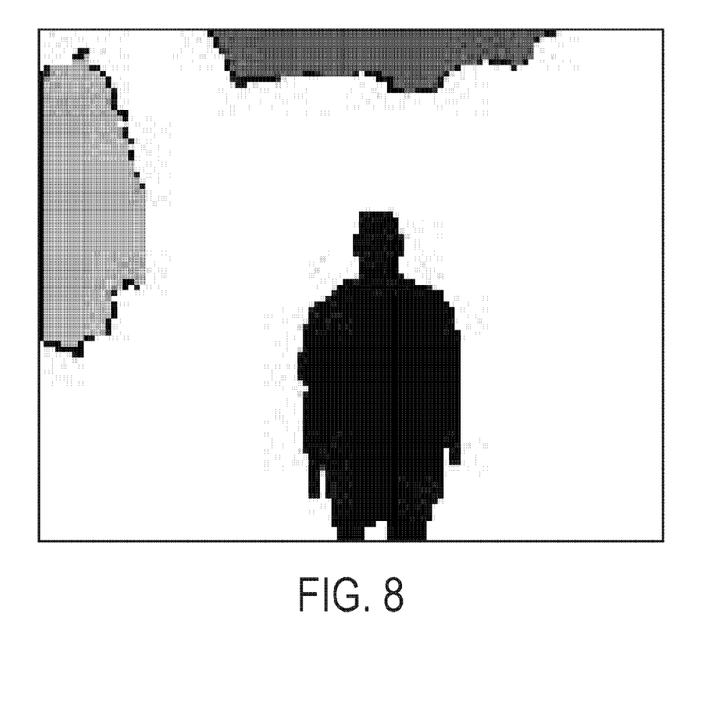
FIG. 8 is an output from a connected components algorithm.

Output from the connected components algorithm typically consists of numerous small components representing various non-human objects in the environment. These erroneous components are pruned using a simple size-base heuristic where components with a low point count are discarded. The final result is depicted in FIG. 8.

The connected components algorithm and heuristic set works well for many environments. However, numerous non-human objects can still appear in the result set. To solve this problem, a support vector machine (SVM) can be trained on the shape of a human, specially a human's head and shoulder profile. The trained SVM can then identify which connected components are human and which are not.

Figure 9:
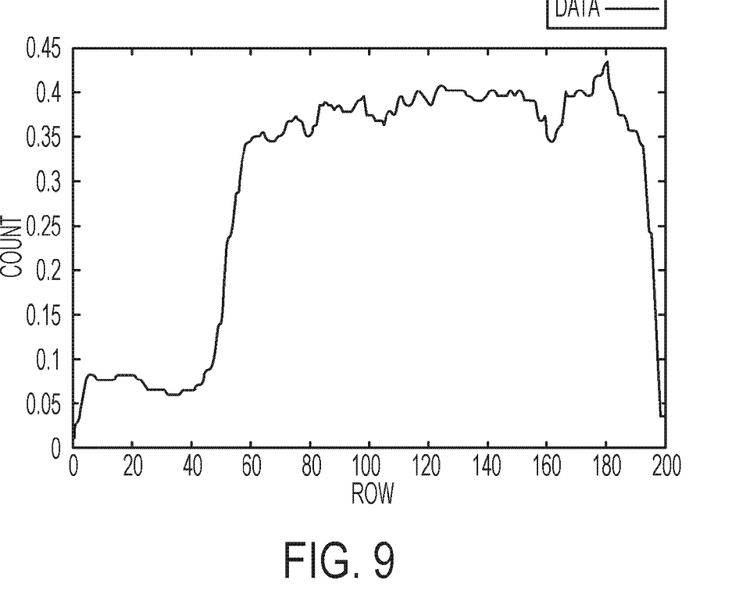
FIG. 9 depicts a row histogram from the connected component of FIG. 8.
Figure 10:
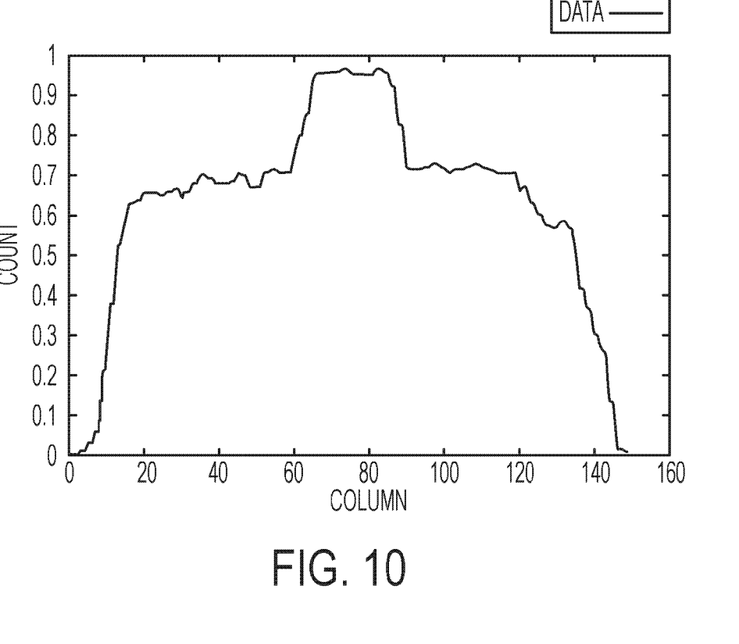
FIG. 10 depicts a column histogram from the connected component of FIG. 8.

An SVM is a learning algorithm used in pattern classification and regression. The working principal behind an SVM is to project feature vectors into a higher order space where separating hyperplanes can classify the data. Our feature vector consists of the shape of the human in the form of a row-oriented and column-oriented histogram. For a given connected component, the row-oriented histogram is computed by summing the number of points in each row of the connected component. The column-oriented histogram is computed based on data in the columns of the connected component. FIGS. 9 and 10 depict the row histogram and column histogram, respectively, from a connected component found in FIG. 8.

Tracking the location of a detected person is accomplish via a Kalman filter, which estimates the future pose of a person, and then corrects based on observations. A Kalman filter's update cycle is fast and has seen wide spread use in real-time systems. This approach provides an efficient means to follow a single moving object, in this case a human, in the presence of uncertainty.

Gesture Recognition

The remote vehicle can additionally observe and infer commands communicated by gestures. To describe our solution to this problem, we will first describe our learning and recognition framework. Next, we will define our gesture state space, and the features we use to make inferences. And finally, we will discuss the role of training in the gesture recognition process.

Gesture recognition must make inferences from ambiguous, single-view data at real-time rates. The framework should therefore be both probabilistic and fast. Because the state space of gestures is discrete, and because certain assumptions can be made regarding conditional independence, a Hidden Markov Model (HMM) can provide both speed and probabilistic interpretation in accordance with certain embodiments of the present teachings.

At each time step, we infer a discrete variable $x_t$ (which gesture is being performed) from continuous observations $z_{1:t}$ relating to a pose.

Figure 11:
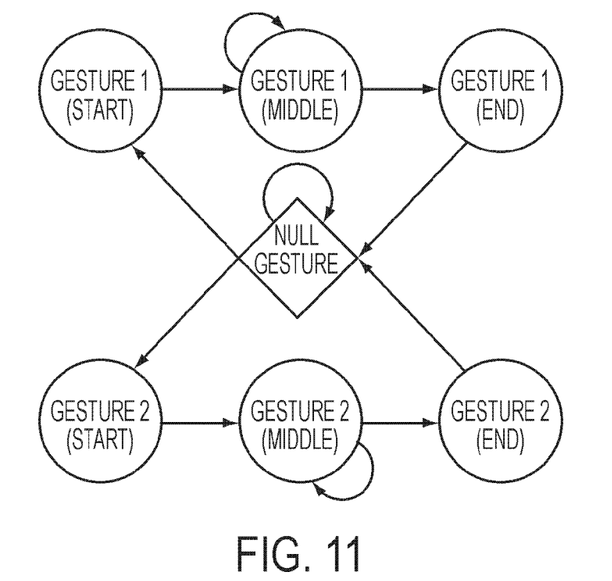
FIG. 11 illustrates a Markov chain for gesture states.

At any given time, a person is performing one of a set of predefined gestures. Each gesture can be divided into a beginning, middle, and end. A "null" gesture can be assigned to the hypothesis that a person is not performing any learned gesture of interest. A Markov chain for these states is shown in FIG. 11 for two gestures.

To recognize gestures, the system must infer something about poses over time. We begin with the silhouette and three-dimensional head position introduced in the tracking stage. This information must be processed to arrive at an observation feature space, since a silhouette image is too high-dimensional to be useful as a direct observation.

Overall approaches to this problem can include appearance-based, motion-based, and model-based approaches. Appearance- and motion-based approaches are essentially image-based, while a model-based approach assumes the use of a body model. The description below utilizes a model-based approach, although the present invention contemplates alternatively using a motion-based or appearance-based approach. A model-based approach can have more potential for invariance (e.g., rotational invariance), flexibility (e.g., body model adjustments), and the use of world-space and angle-space error (instead of image-based error).

Specifically, a cylindrical body model can be arranged in a pose of interest, and its silhouette rendered. Pose hypotheses can be generated from each gesture model in our database, sampled directly from actor-generated gesture poses. A pose hypothesis can then be rendered and compared against a silhouette. Chamfer matching, can be is used to compare the similarity of the silhouettes. The system then performs a search in the space of each gesture's pose database, finding the best matching pose for each gesture. The database is described in more detail below.

In accordance with certain embodiments, poses in the gesture database can be ordered over time. This has two consequences. First, it creates a measure of gesture progress for that pose: if the subject is performing a real (non-null) gesture, that person will be in some state of gesture progress, which ranges between 0 and 1. Secondly, searches can become faster by using an algorithm similar to binary search; thus "closing in" on the correct pose in O(log(n)) time, where n is the number of poses in the database.

Once a best pose for each gesture is determined, constraints are considered. First, the chamfer distance should be low: if the best pose for a gesture has high Chamfer distance, it is unlikely that the gesture is being performed. The gesture progress can also have certain characteristics. For example, the starting point of a gesture can have low gesture progress, the middle can have an average gesture progress around 0.5 with a wide distribution, and the ending point of the gesture can have high gesture progress. Also, a derivative in gesture progress can be used; in the middle of a gesture, a gesture's pose should travel forward in the gesture, while at the beginning and end, the derivative of the gesture progress should be static. The derivative of gesture progress should generally be non-negative.

To summarize, there are three observation variables per gesture: a Chamfer distance, a gesture progress indicator, and the derivative of the gesture progress indicator. For two gestures, this results in six observation variables. Observation probabilities are trained as Gaussian, resulting in one covariance matrix and one mean for each state.

Two parts of the model can be considered for training. First, each gesture should be trained as a set of observed, ground-truth motions. A person can perform various gestures, and his movements can be recorded in a motion capture laboratory, for example with a Vicon system. A set of time-varying poses can be recovered for each gesture. Gestures can be recorded several times with slightly different articulations, with the intent of capturing the "space" of a gesture.

Next, it is desirable to perform training in the observed feature space. Given six datasets, with multiple examples of each gesture in each, the remote vehicle can be trained. Again, the observations were trained as Gaussian; given a particular gesture, a covariance matrix can be learned over the observation variables.

Communication Through Dialogue

Spoken dialogue can allow a remote vehicle to expressively communicate with the human operator in a natural manner. A system of the present teachings incorporates direct two-way communication between a remote vehicle and a human through speech recognition and speech synthesis. Using a wireless Bluetooth headset equipped with a noise-canceling microphone, an embodiment of the system can recognize an operator's spoken commands and translate them into text. An additional component can allow the remote vehicle to speak back in a natural manner. The resulting hands-free interface allows the operator to communicate detailed information to the remote vehicle, even without line of sight.

Speech recognition can allow a remote vehicle to recognize and interpret the communication and intent of a human operator. In certain embodiments of the present teachings, CMU Sphinx3 speech recognition software can be used for speech recognition. The speech recognition component should provide robust and accurate recognition under the noisy conditions commonly encountered in real-world environments. To improve recognition accuracy, a noise-canceling microphone can be used, and a custom acoustic model can be trained with an abbreviated vocabulary set under noisy conditions. The abbreviated vocabulary set limits the word choice to those relevant to the remote vehicle task, improving overall recognition.

Speech synthesis can be performed using, for example, a Cepstral Text-to-Speech system, which can enable any written phrase to be spoken in a realistic, clear voice. The Cepstral system can allow the remote vehicle to verbally report its status, confirm received commands, and communicate with its operator in a natural way.

Behaviors

The PackBot EOD has numerous actuators to control in pursuit of specific goals that have been commanded, for example by a human operator. Behaviors are used to control these actuators, and provide a convenient mechanism to activate specific time-extended goals such as door-breaching and person-following. Coordination among the behaviors is achieved by assigning a unique priority to each behavior. A behavior with a high priority will override actuator commands produced by behaviors with a lower priority. By assigning these priorities appropriately, the complete system can perform fast reactive behaviors, such as obstacle avoidance, to achieve long term behaviors, such as door-breaching. Other behaviors can be utilized, such as those disclosed in U.S. patent application Ser. No. 11/748,363, titled Autonomous Behaviors for a remote Vehicle, filed May 14, 2007, the entire content of which is incorporated herein by reference.

The person-following behavior can utilize output generated by a Kalman filter to follow a person. Kalman filter output is the pose of a person relative to the remote vehicle's pose. This information can be fed into three PID controllers to adjust the remote vehicle's angular velocity, linear velocity, and camera pan angle. The camera can capable of rotating at a faster rate than the remote vehicle base, which helps to maintain the person centered in the SwissRanger's field of view. While the camera pans to track the person, the slower base can also rotate to adjust the remote vehicle's trajectory. The final PID controller can maintain a linear distance, for example, of about 1.5 meters from the person.

Door-breaching is another behavior that can be activated by a gesture. This behavior uses data generated by the Kalman filter and from the SwissRanger. Once activated, this behavior can use the Kalman filter data to identify the general location of the doorway—which can be assumed to be behind the person—and the SwissRanger data to safely traverse through to the next room. During a breach, the remote vehicle identifies where the two vertical doorframes are located, and navigates to pass between them.

A U-Turn behavior instructs the remote vehicle to perform a 180° turn in place. The behavior monitors the odometric pose of the remote vehicle in order to determine when a complete half circle has been circumscribed.

The final behavior performs a pre-programmed forward motion, and is activated, for example, by a "Forward Little" command. In accordance with certain embodiments of the present teachings, it is assumed there is 2 meters of clear space in front of the remote vehicle.

Figure 12:
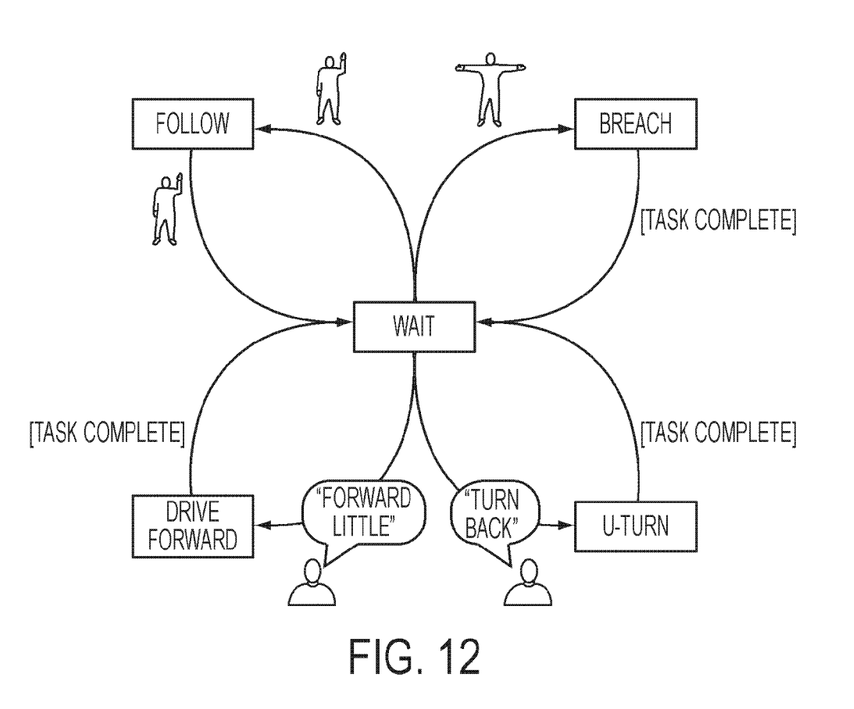
FIG. 12 illustrates transitions between exemplary remote vehicle behaviors.

Transitions between each of the above behaviors are summarized in FIG. 12. The present teachings also contemplate employing other behaviors such as an obstacle avoidance behavior.

Human-Remote Vehicle Teams

Each remote vehicle in a team must be capable of making decisions and reacting to human commands. These tasks are compounded by the dynamic environments in which the teams will operate.

Adjustable autonomy refers to an artificial agent's ability to defer decisions to a human operator under predetermined circumstances. By applying adjustable autonomy, remote vehicles can autonomously make some decisions given sufficient data, or defer decisions to a human operator. In a tactical team, however, each member must act independently in real-time based on mission goals, team member actions, and external influences. A remote vehicle in this situation cannot defer decisions to a human, and a human is not capable of continually responding to remote vehicle requests for instruction.

Multi-agent systems (MAS) can coordinate teams of artificial agents assigned to specific tasks; however, MAS is only applicable to teams constructed of artificial agents. Humans cannot use the same notion of joint persistent goals and team operators, and they cannot communicate belief and state information at the necessary bandwidth.

It is vital for a cohesive team to have convenient, natural, and quick communication. In stressful situations, where fast paced coordination of actions is required, humans cannot be encumbered with clumsy communication devices and endless streams of communication from the remote vehicles. This differs from most multi-agent teams which contain no humans and the agents are able to transmit large amounts of data at will.

There has been some work on the topic of human remote vehicle team communication. For example, MIT's Leonardo robot demonstrates a feasible approach to communication and coordination with human remote vehicle teams. The Leonardo robot is a humanoid torso with a face and head capable of a wide range of expressions. The robot was used to study how a human can work side-by-side with a remote vehicle while communicating intentions and beliefs through gestures. This type of gesture-based communication is easy for humans to use and understand and requires no extra human-remote vehicle hardware interface.

Greater communication bandwidth and frequency exist between remote vehicles than between humans. This allows remote vehicles to share more information more frequently among themselves. With this ability, remote vehicles are capable of transmitting state information, gesture observations, and other environmental data to each other. Subsequently the problem of team state estimation, and coordination among the remote vehicles, is simplified.

Inter-remote vehicle coordination benefits greatly from high-speed communication because multi-remote vehicle coordination techniques typically rely on frequent communication in the form of state transmission and negotiation. Auction-based techniques can be utilized for such communication, which have been shown to scale well in the size of the team and number of tasks. In scenarios where a gesture applies to all of the remote vehicles, the remote vehicles must coordinate their actions to effectively achieve the task. In these cases, the choice of a task allocation algorithm will be based on a performance analysis. In situations where a human gives a direct order to an individual remote vehicle, a complete multi-remote vehicle task allocation solution is not required.

A practical framework for remote vehicles to operate within a human team on tactical field missions must have a set of requirements that will ensure reliability and usability. The requirements can include, for example, convenient communication between team members, accurate and fast response to commands, establishment of a mutual belief between team members, and knowledge of team member capabilities.

In order to meet these requirements, the present teachings contemplate borrowing from multi-agent systems (MAS), human-robot interaction, and gesture-based communication.

The principal behind establishing and maintaining team goals and coordinating multiple agents is communication of state and beliefs. For a team of agents to work together, they all must have a desire to complete the same goal, the belief that the goal is not yet accomplished, and the belief the goal can still be accomplished. These beliefs are held by each team member and propagated when they change, due to observations and actions of team members and non-team members. This strategy allows the team as a whole to maintain a consist understanding of the team's state.

Execution of a task is accomplished through individual and team operators. Each type of operator defines a set of preconditions for selection execution rules, and termination rules. Individual operators apply to a single agent, while team operators apply to the entire team. The team operators allow the agents to act cooperatively toward a unified goal, while individual operators allow an individual agent to accomplish tasks outside of the scope of the team.

Members of a team must also coordinate their actions and respond appropriately to failures and changes within the environment. This can be accomplished by establishing an explicit model of teamwork based on joint intention theory. Team goals are expressed as joint persistent goals where every member in the team is committed to completing an action. A joint persistent goal holds as long as three conditions are satisfied: (1) all team members know the action has not been reached; (2) all team members are committed to completing the action; and (3) all team members mutually believe that until the action is achieved, unachievable, or irrelevant that they each hold the action as a goal.

The concept of joint goals can be implemented using team operators that express a team's joint activity. Roles, or individual operators, are further assigned to each team member depending on the agent's capabilities and the requirements of the team operator. Through this framework a team can maintain explicit beliefs about its goals, which of the goals are currently active, and what role each remote vehicle plays in completing the team goals.

Most human teams rely on the belief that all members are competent, intelligent, and trained to complete a task. Significant trust exists in an all human teams that cannot be replaced with constant communication. Therefore, each team member must know the team goals, roles they each play, constraints between team members, and how to handle failures. This is heavily based on joint intentions due to its expressiveness and proven ability to coordinate teams. The tight integration of humans into the team makes strict adherence to joint intentions theory difficult. To overcome this problem, remote vehicles can default to a behavior of monitoring humans and waiting for gesture based commands. Upon recognition of a command, the remote vehicles act according to a predefined plan that maps gestures to actions.

In an exemplary implementation of a system in accordance with the present teachings, an iRobot PackBot EOD UGV is utilized, with an additional sensor suite and computational payload. The additional hardware payload on the remote vehicle of this exemplary implementation includes:

Tyzx G2 stereo vision system to support person detection, tracking, and following, obstacle detection and avoidance, and gesture recognition Athena Micro Guidestar six-axis INS/GPS positioning system to support UGV localization during distal interactions between the human and UGV Remote Reality Raven 360 degree camera system to enhance person detection and tracking 1.8 GHz Mobile Pentium IV CPU running iRemote vehicle's Aware 2 software architecture to provide the computational capabilities to handle the sensor processing and behavior execution necessary for this project The Tyzx G2 stereo vision system is a compact, ultra-fast, high-precision, long-range stereo vision system based on a custom DeepSea stereo vision processor. In accordance with certain embodiments of the present teachings, the stereo range data can be used to facilitate person detection tracking, following, and to support obstacle detection and avoidance behaviors to enable autonomous navigation.

The G2 is a self-contained vision module including cameras and a processing card that uses a custom DeepSea ASIC processor to perform stereo correspondence at VGA (512× 320) resolution at frame rates of up to 30 Hz. The Tyzx G2 system is mounted on a PackBot EOD UGV arm and can interface directly with the PackBot payload connector. Depth images from the G2 are transmitted over a 100 MB Ethernet to the PackBot processor.

The Athena Micro Guidestar is an integrated six-axis INS/GPS positioning system including three MEMS gyros, three MEMS accelerometers, and a GPS receiver. The unit combines the INS and GPS information using a Kalman filter to produce a real-time position and orientation estimate.

The Remote Reality Raven 360 degree camera system can be used in conjunction with the Tyzx stereo vision system for person detection and following. Person following in dynamic fast-moving environments can require both dense 3D range information as well as tracking sensors with a large field-of-view. The Tyzx system has a 45 degree field-of-view that is adequate for tracking of an acquired person; however, if the person being tracked moves too quickly the system will lose them and often times have difficulties re-acquiring. The Remote Reality camera provides a 360 degree field-of-view that can be used for visual tracking and re-acquisition of targets should they leave the view of the primary Tyzx stereo vision system. This increased field-of-view can greatly increase the effectiveness and robustness of the person detection, tracking, and following system.

Figure 13:
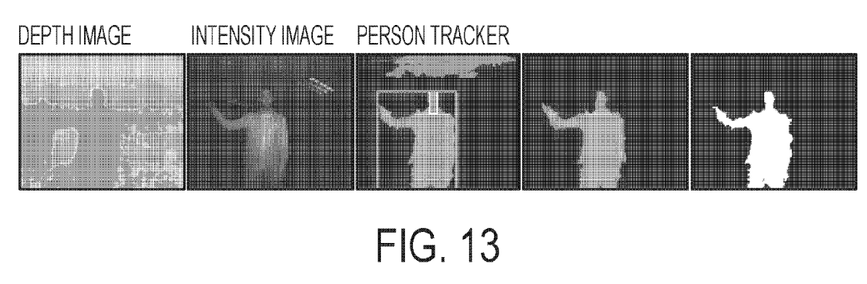
FIG. 13 illustrates depth images from a SwissRanger camera for human kinematic pose and gesture recognition.

A system in accordance with the present teaching can provide human kinematic pose and gesture recognition using depth images (an example of which are illustrated in FIG. 13 for a CSEM SwissRanger SR-3000, which calculates depth from infrared time-of-flight). Because the SwissRanger requires emission and sensing of infrared, it works well in indoor and overcast outdoor environments, but saturates in bright sunlight. A commodity stereo vision device can be used to adapt this recognition system to more uncontrolled outdoor environments.

For communication at variable distances, a Nintendo Wiimote (see FIG. 14) can be used by an operator to perform: 1) coarse gesturing, 2) movement-based remote vehicle teleoperation, and 3) pointing in a common frame of reference. The Nintendo Wiimote is a small handheld input device that can be used to sense 2-6 DOFs of human input and send the information wirelessly over Bluetooth. Wiimote-based input occurs by sensing the pose of the device when held by the user and sending this pose to a base computer with a Bluetooth interface. The Wiimote is typically held in the user's hand and, thus, provides an estimate of the pose of the user's hand. Using MEMS accelerometers, the Wiimote can be used as a stand-alone device to measure 2 DOF pose as pitch and roll angles in global coordinates (i.e., with respect to the Earth's gravitational field). Given external IR beacons in a known pattern, the Wiimote can be localized to a 6 DOF pose (3D position and orientation) by viewing these points of light through an IR camera on its front face.

Figure 14:
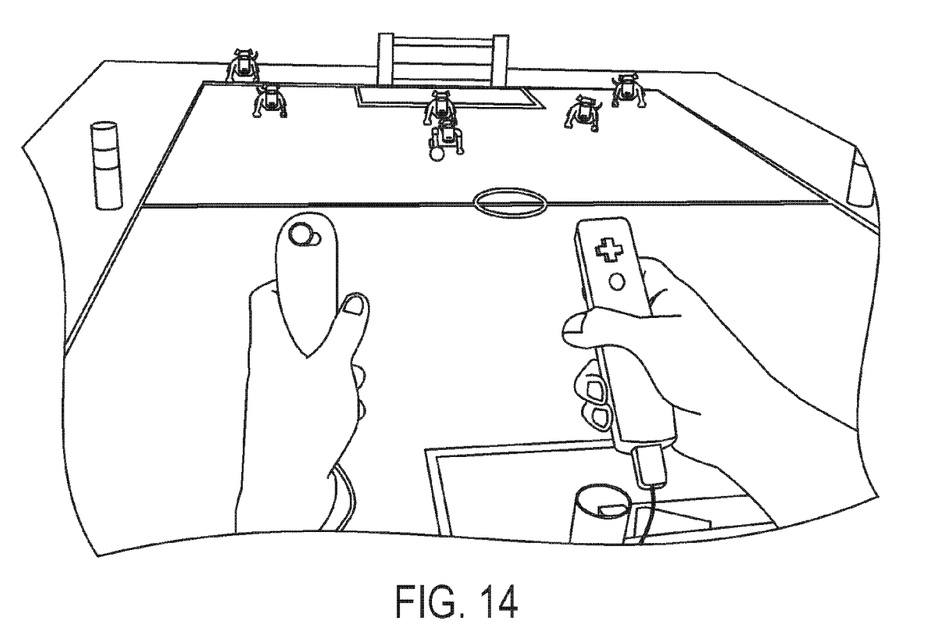
FIG. 14 shows a Nintendo Wiimote that can be utilized in certain embodiments of the present teachings.

The Wiimote can also be accompanied with a Nintendo Nunchuck for an additional 2 degrees of freedom of accelerometer-based input. Many gestures produce distinct accelerometer signatures. These signatures can be easily identified by simple and fast classification algorithms (e.g., nearest neighbor classifiers) with high accuracy (typically over 90%). Using this classification, the gestures of a human user can be recognized onboard the Wiimote and communicated remotely to the remote vehicle via Bluetooth (or 802.11 using an intermediate node).

In addition to gesture recognition, the Wiimote can also be used to provide a pointing interface in a reference frame common to both the operator and the remote vehicle. In this scenario, a 6DOF Wiimote pose can be localized in the remote vehicle's coordinate frame. With the localized Wiimote, the remote vehicle could geometrically infer a ray in 3D indicating the direction that the operator is pointing. The remote vehicle can then project this ray into its visual coordinates and estimate objects in the environment that the operator wants the remote vehicle to explore, investigate, or address in some fashion. Wiimote localization can require IR emitters with a known configuration to the remote vehicle that can be viewed by the Wiimote's infrared camera.

In certain embodiments of the present teachings, the speech recognition system is provided by Think-a-Move, which captures sound waves in the ear canal and uses them for hands-free control of remote vehicles. Think-a-Move's technology enables clear voice-based command and control of remote vehicles in high-noise environments.

The voice inputs received by the Think-a-Move system are processed by an integral speech recognition system to produce discrete digital commands that can then be wirelessly transmitted to a remote vehicle.

In certain embodiments of the present teachings, speech recognition can be performed by a Cepstral Text-to-Speech system. Speech synthesis can allow a remote vehicle to communicate back to the operator verbally to quickly share information and remote vehicle state in a way that minimizes operator distraction. The speech synthesis outputs can be provided to the operator through existing speakers on the remote vehicle or into the ear piece worn by an operator, for example into an earpiece of the above-mentioned Think-a-Move system.

Behaviors

To support higher-level tactical operations performed in coordination with one or more human operators, it is beneficial for the remote vehicle to have a set of discrete, relevant behaviors. Thus, a suite of behaviors can be developed to support a specified tactical maneuver. Common behaviors to be developed that will be needed support any maneuver can include person detection, tracking, and following and obstacle detection and avoidance.

Person Detection and Tracking

In accordance with certain embodiments of the present teachings, the person detecting algorithm relies on an observation that contiguous objects generally have slowly varying depth. In other words, a solid object has roughly the same depth, or Z-value, over its visible surface. An algorithm capable of detecting these solid surfaces is well suited for human detection. Using such an algorithm, no markings are needed on the person to be detected and tracked; therefore, the system will work with a variety of people and not require modifying the environment to enable person detection and tracking.

The person-detecting algorithm can, in certain embodiments, be a connected components algorithm, which groups together pixels in an image based on a distance metric. Each pixel is a point in 3D space, and the distance metric is the Euclidean distance along a Z-axis between two points. If the distance is less than a threshold value the two points are considered to be part of the same object. The output of the algorithm is a set of groups, where each group is a disjoint collection of all the points in the image.

Output from a connected components algorithm typically consists of numerous small components representing various non-human objects in the environment. These erroneous components can be pruned using a simple size-base heuristic where components with a low point count are discarded. A support vector machine (SVM) can then be trained on the shape of a human, particularly a human's head and shoulder profile. The trained SVM can then be used to identify which connected components are human and which are not.

Obstacle Avoidance

To support an obstacle avoidance behavior, certain embodiments of the present teachings leverage an obstacle avoidance algorithm that uses a Scaled Vector Field Histogram (SVFH). This algorithm is an extension of the Vector Field Histogram (VFH) techniques developed by Borenstein and Koren [Borenstein & Koren 89] at the University of Michigan. In the standard VFH technique, an occupancy grid is created, and a polar histogram of an obstacle's locations is created, relative to the remote vehicle's current location. Individual occupancy cells are mapped to a corresponding wedge or "sector" of space in the polar histogram. Each sector corresponds to a histogram bin, and the value for each bin is equal to the sum of all the occupancy grid cell values within the sector.

A bin value threshold is used to determine whether the bearing corresponding to a specific bin is open or blocked. If the bin value is under this threshold, the corresponding direction is considered clear. If the bin value meets or exceeds this threshold, the corresponding direction is considered blocked. Once the VFH has determined which headings are open and which are blocked, the remote vehicle then picks the heading closest to its desired heading toward its target/waypoint and moves in that direction.

The SVFH is similar to the VFH, except that the occupancy values are spread across neighboring bins. Because a remote vehicle is not a point object, an obstacle that may be easily avoided at long range may require more drastic avoidance maneuvers at short range, and this is reflected in the bin values of the SVFH. The extent of the spread is given by:

$$\theta = k/r$$

Where k is the spread factor (for example, 0.4), r is the range reading, and e is the spread angle in radians. For example, if k=0.4 and r=1 meter, then the spread angle is 0.4 radians (23 degrees). So a range reading at 1 meter for a bearing of 45 degrees will increment the bins from 45−23=22 degrees to 45+23=68 degrees. For a range reading of 0.5 degrees, the spread angle would be 0.8 radians (46 degrees), so a range reading at 0.5 meters will increment the bins from 45−46=−1 degrees to 45+46=91 degrees. In this way, the SVFH causes the remote vehicle to turn more sharply to avoid nearby obstacles than to avoid more distant obstacles.

In certain embodiments of the present teachings, the system may operate under Aware 2.0™ Remote vehicle Intelligence Software commercial computer software.

Other exemplary uses of a remote vehicle having capabilities in accordance with the present teachings include military applications as building clearing a commercial applications such as:

Civil fire and first responder teaming using remote vehicles teamed with firefighters and first responders to rapidly plan responses to emergency events and missions Industrial plant and civil infrastructure monitoring, security, and maintenance tasks combining remote vehicles and workers Construction systems deploying automated machinery and skilled crews in multi-phase developments Large scale agriculture using labor and automated machinery for various phases field preparation, monitoring, planting, tending, and harvesting processes Health care and elder care.

While the present invention has been disclosed in terms of exemplary embodiments in order to facilitate better understanding of the invention, it should be appreciated that the invention can be embodied in various ways without departing from the principle of the invention. Accordingly, while the present invention has been disclosed in terms of front effective aligning stiffness and front total steering moment, the teachings as disclosed work equally well for front, rear, and four-wheel drive vehicles, being independent of vehicle drive type. Therefore, the invention should be understood to include all possible embodiments which can be embodied without departing from the principle of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A method for facilitating cooperation between humans and remote vehicles, the method comprising:
   creating a scene image including 3D point cloud data;
   connecting components within the scene image to extract all large solid objects from the scene image using the point cloud data;
   executing a support vector machine trained on a shape of a human to identify a human shape among the large solid objects within the scene image;
   extracting gesture information of observed poses of human arms from the human shape using a trained statistical model trained on poses of human arms in scene images, the gesture information corresponding to at least one remote vehicle motion command to control a remote vehicle behavior;
   scoring the gesture information relative to a set of known gestures;
   when a sequence of gesture information matches a complete sequence associated with a known gesture, mapping the at least one remote vehicle motion command to one or more remote vehicle behaviors; and
   activating the one or more remote vehicle behaviors.

2. The method of claim 1, wherein the remote vehicle behavior gathers data from sensors of the remote vehicle and outputs one or more motion commands.

3. The method of claim 1, wherein the remote vehicle behavior includes one of person-following, obstacle-avoidance, door-breaching, u-turn, start/stop following and manual forward drive.

4. The method of claim 3, wherein conflicts between remote vehicle behaviors are resolved by assigning unique priorities to each remote vehicle behavior.

5. The method of claim 4, wherein commands from a low priority remote vehicle behavior are overridden by those from a high priority remote vehicle behavior.

6. The method of claim 1, wherein voice commands are issued into a wireless headset worn by a human operator.

7. The method of claim 1, further comprising utilizing speech synthesis to allow the remote vehicle to communicate with an operator in a natural way.

8. The method of claim 1, wherein the remote vehicle behavior includes person following.

9. The method of claim 1, wherein the trained statistical model is a trained Hidden Markov Model.

10. The method of claim 1, comprising analyzing voice commands with speech recognition software.

11. The method of claim 1, comprising creating image data from a camera.

12. The method of claim 11, wherein the camera comprises a time-of-flight camera.

13. The method of claim 11, wherein the camera comprises a 3D time-of-flight camera.

14. The method of claim 11, wherein the camera comprises part of a stereo vision system.

* * * * *